United States Patent
Xu et al.

(10) Patent No.: US 11,054,334 B2
(45) Date of Patent: Jul. 6, 2021

(54) DIE CASTING MACHINE MELT LEAKAGE DETECTING DEVICE

(71) Applicant: CITIC Dicastal CO., LTD., Hebei (CN)

(72) Inventors: Zuo Xu, Qinhuangdao (CN); Guoyuan Xiong, Qinhuangdao (CN); Lin Chen, Qinhuangdao (CN); Jie Lyu, Qinhuangdao (CN); Heng Wang, Qinhuangdao (CN); Hongqing Xu, Qinhuangdao (CN); Wenming He, Qinhuangdao (CN); Jinyong Hao, Qinhuangdao (CN); Xingjie Zhang, Qinhuangdao (CN); Zhiying Ma, Qinhuangdao (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 0 days.

(21) Appl. No.: 16/712,117

(22) Filed: Dec. 12, 2019

(65) Prior Publication Data
US 2020/0309633 A1 Oct. 1, 2020

(30) Foreign Application Priority Data
Mar. 29, 2019 (CN) .......................... 201910252624.5

(51) Int. Cl.
G01M 3/04 (2006.01)
G01M 3/00 (2006.01)
B22D 46/00 (2006.01)

(52) U.S. Cl.
CPC ............ *G01M 3/042* (2013.01); *G01M 3/002* (2013.01); *B22D 46/00* (2013.01)

(58) Field of Classification Search
CPC ......... B22D 11/07; B22D 45/00; B22D 33/00
See application file for complete search history.

(56) References Cited

U.S. PATENT DOCUMENTS

| 1,494,159 | A | * | 5/1924 | Duggelin | ............... | G08B 25/12 340/524 |
| 1,726,477 | A | * | 8/1929 | Dyck | ..................... | G08B 17/00 116/106 |

(Continued)

FOREIGN PATENT DOCUMENTS

| JP | H0655254 A | 3/1994 |
| JP | H08313385 A | 11/1996 |

(Continued)

OTHER PUBLICATIONS

Supplementary European Search Report in the European application No. 19196070.7, dated Dec. 4, 2019, 5 pgs.

*Primary Examiner* — Paul M. West
*Assistant Examiner* — Mark A Shabman
(74) *Attorney, Agent, or Firm* — Cooper Legal Group, LLC

(57) ABSTRACT

A die casting machine melt leakage detecting device includes a pulling wire, multiple wire winding columns, a wire fixing member, an elastic wire connecting member and a trigger switch. The pulling wire is capable of withstanding temperature outside a mold during normal die casting and is melted and broken after making contact with molten metal. The multiple wire winding columns are arranged around the mold, an end of the pulling wire is connected with the wire fixing member, and another end of the pulling wire is sequentially wound around the wire winding columns and is connected with the elastic wire connecting member. The elastic wire connecting member is opposite to the trigger switch, the elastic wire connecting member is in a compressed or stretched state when the pulling wire is kept tensioned in the operating state.

10 Claims, 3 Drawing Sheets

(56) References Cited

U.S. PATENT DOCUMENTS 1,935,611 A * 11/1933 Bourbon ................ G08B 17/06
                                                                           337/407
8,289,122 B2 * 10/2012 Matthiesen .......... H01H 37/761
                                                                           337/167

FOREIGN PATENT DOCUMENTS

| | | | |
|---|---|---|---|
| JP | 2008238243 | A | 10/2008 |
| JP | 2010247157 | A | 11/2010 |

* cited by examiner

DIE CASTING MACHINE MELT LEAKAGE DETECTING DEVICE

CROSS-REFERENCE TO RELATED APPLICATION

The present application claims benefit of Chinese Patent Application No. 201910252624.5, filed on Mar. 29, 2019, the contents of which are hereby incorporated by reference in their entirety.

BACKGROUND

According to the operation principle of die casting machines, the die casting machines are a series of industrial casting machines for injecting molten metal (Al alloy melt or Mg alloy melt) into a mold for cooling molding through system pressurization, and obtaining solid metal castings after demolding. With the advancement of science, technology and industrial production, the die-casting technology has achieved rapid development in many fields such as wheel hubs and automobile parts. During the actual operation of the die casting machines, the situation that the metal melt overflows or is ejected from molds (hereinafter referred to as melt leakage) due to misoperation of operators or foreign matter caught in side molds often occurs, consequently, serious damage to the personal safety of the operators is caused, and equipment components are seriously damaged. If the melt leakage condition can be detected in time, the die casting machines can be depressurized and stopped immediately after melt leaks immediately, thus, the stability of the die casting machine equipment can be improved, and the replacement frequency and cost of spare parts of the die casting machines are reduced.

Accordingly, there is a need for a die casting machine melt leakage detecting device which can solve or at least mitigate the defects in the related art.

SUMMARY

The present disclosure relates to the technical field of safety detection of a die casting machine, in particular to a die casting machine melt leakage detecting device.

The present disclosure arms to solve the technical problems that after the melt leakage phenomenon of a die-casting machine occurs, melt leakage cannot be detected in time, and major safety accidents and property losses are caused.

The technical solution adopted by the present disclosure is described below.

The present disclosure provides a die casting machine melt leakage detecting device, the device includes a pulling wire, multiple wire winding columns, a wire fixing member, an elastic wire connecting member and a trigger switch;

the pulling wire is capable of withstanding the temperature outside a mold during normal die casting, and is melted and broken after making contact with molten metal;

the multiple wire winding columns are arranged around the mold, an end of the pulling wire is connected with the wire fixing member, and another end of the pulling wire is sequentially wound around the multiple wire winding columns and is connected with the elastic wire connecting member;

the elastic wire connecting member is opposite to the trigger switch, the elastic wire connecting member is in a compressed or stretched state when the pulling wire is kept tensioned in the operating state, and the elastic wire connecting member is restored to its original position and impacts the trigger switch when the pulling wire is broken;

the trigger switch is used for sending an impacting signal to a signal receiving end of a die casting machine.

In an embodiment, a nylon wire resistant to a temperature of 200 DEG C. is used as the pulling wire.

In an embodiment, three wire winding columns are arranged, and the three wire winding columns are fixed to three vertices of the mold respectively.

In an embodiment, the pulling wire is rectangularly arranged around outside of the mold, and a distance between the pulling wire and the mold is 3 to 5 cm.

In an embodiment, the wire fixing member includes a tension adjusting plate and a screw;

the tension adjusting plate is fixed on a bottom plate of the die casting machine; the tension adjusting plate is provided with a screw hole matched with the screw; the screw passes through and is fixed in the screw hole; and an end of the pulling wire is connected with the screw.

In an embodiment, the elastic wire connecting member includes a fixing plate, a sliding rod and a spring;

the fixing plate is fixed on a stand column of the die casting machine; the fixing plate is provided with a through hole; and the sliding rod is slidably delimited in the through hole;

an end of the sliding rod is connected with the pulling wire, and the other end of the sliding rod is opposite to the trigger switch;

the spring is mounted around the sliding rod and is located between the end of the sliding rod and the fixing plate.

In an embodiment, the spring is located between the another end of the sliding rod and the fixing plate, and the spring is in a compressed state when the pulling wire is in the operating state; or the two ends of the spring are connected with the end of the sliding rod and the fixing plate respectively, and the spring is in a stretched state when the pulling wire is in the operating state.

In an embodiment, an end of the screw is provided with a threading hole.

In an embodiment, an end of the sliding rod is provided with a threading hole.

In an embodiment, multiple insertion holes are formed in the bottom plate of the die casting machine, and the bottom ends of the wire winding columns are detachably inserted into the insertion holes respectively.

According to one or more embodiments of the present disclosure, the die casting machine melt leakage detecting device can achieve the following effects:

with the die casting machine melt leakage detecting device of the present disclosure, by fixedly arranging the pulling wire around the mold, the elastic wire connecting member is spaced apart from and opposite to the trigger switch when the pulling wire is tensioned in the operating state, the melt leakage phenomenon can be determined when the elastic wire connecting member impacts the trigger switch, thus, operators can conveniently know the occurrence of the melt leakage phenomenon in time, then property losses are avoided, and the operation safety is improved.

BRIEF DESCRIPTION OF THE DRAWINGS

The technical and industrial significance of the features, advantages and exemplary embodiments of the present disclosure will be described with reference to the accompanying drawings, herein

LIST OF REFERENCE SYMBOLS

1—Pulling wire; 2—Wire winding columns; 3—Wire fixing member; 31—Tension adjusting plate; 32—Screw; 4—Elastic wire connecting member; 41—Fixing plate; 42—Sliding rod; 43—Spring; 5—Trigger switch; 6—Insertion holes.

DETAILED DESCRIPTION OF THE EMBODIMENTS

Exemplary embodiments of the present disclosure are described in detail below with reference to the accompanying drawings. The description of the exemplary embodiments is for illustrative purposes only and is not a limitation of the present disclosure and application or usage thereof. Moreover, the dimensions and proportions of all components in the figures are merely schematic and do not strictly correspond to actual products.

Figure 1:
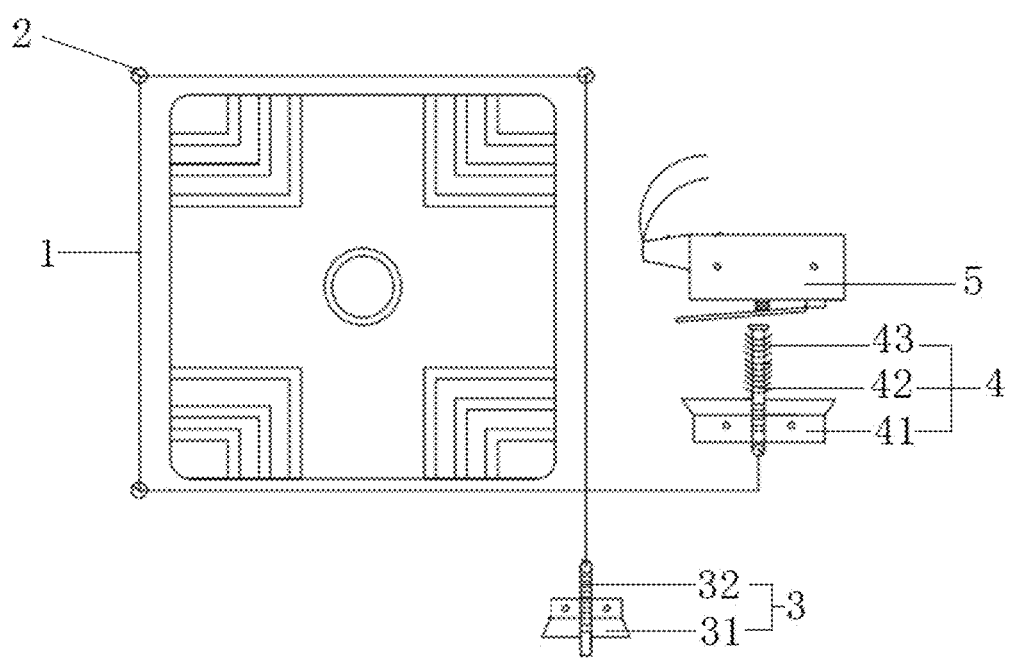
FIG. 1 is a structural schematic diagram of a die casting machine melt leakage detecting device according to the present disclosure.
Figure 2:
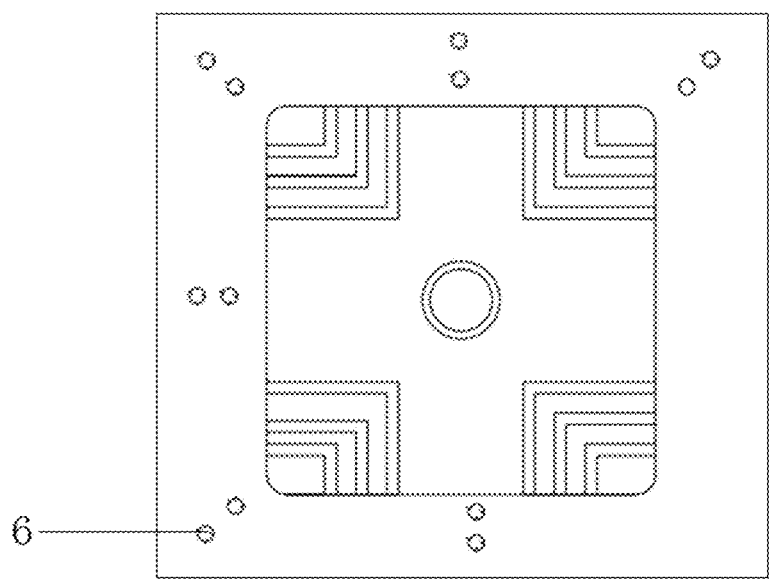
FIG. 2 is a distribution diagram of insertion holes of a die casting machine melt leakage detecting device according to the present disclosure in a bottom plate of a die casting machine.
Figure 3:
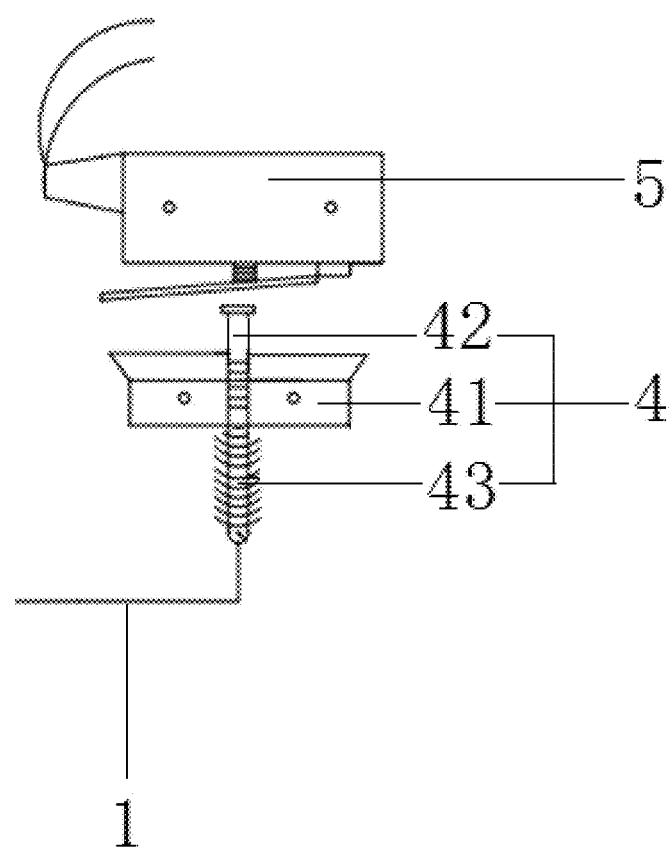
FIG. 3 is a structural schematic diagram of an elastic wire connecting member of a die casting machine melt leakage detecting device according to the present disclosure.

The embodiments of the present disclosure provide a die casting machine melt leakage detecting device, as shown in FIGS. 1 to 3, the device includes a pulling wire 1, multiple wire winding columns 2, a wire fixing member 3, an elastic wire connecting member 4 and a trigger switch 5. The pulling wire 1 is capable of withstanding the temperature outside a mold during normal die casting and is melted and broken after making contact with molten metal. The multiple wire winding columns 2 are arranged around the mold, an end of the pulling wire 1 is connected with the wire fixing member 3, and another end of the pulling wire 1 is sequentially wound around the wire winding columns 2 and is connected with the elastic wire connecting member 4. The elastic wire connecting member 4 is opposite to the trigger switch 5, the elastic wire connecting member 4 is in a compressed or stretched state when the pulling wire 1 is kept tensioned in an operating state, and the elastic wire connecting member 4 is restored to its original position and impacts the trigger switch 5 when the pulling wire 1 is broken; the trigger switch 5 is used for sending an impacting signal to a signal receiving end of a die casting machine.

The operating principle of the die casting machine melt leakage detecting device provided by the embodiments of the present disclosure is described below.

During usage, the pulling wire 1 is wound around the multiple wire winding columns 2 and arranged around the mold, and the two ends of the pulling wire 1 are connected with the wire fixing member 3 and the elastic wire connecting member 4 respectively, so that the pulling wire 1 is kept in a tensioned state. When the die casting operation is normally performed (that is, when the pulling wire 1 is in the operating state), the elastic wire connecting member 4 is spaced apart from and opposite to the trigger switch 5 under the pulling force of the pulling wire 1. When the melt leakage phenomenon occurs, molten metal flows out of the mold and makes contact with the pulling wire 1 which is arranged around the mold, and thus the pulling wire 1 is melted and broken. The pulling force applied to the elastic wire connecting member 4 disappears, and the elastic wire connecting member 4 is restored to its original position and impacts the trigger switch 5. The trigger switch 5 sends an impacting signal to the signal receiving end of the die casting machine. When the signal receiving end of the die casting machine receives the impacting signal, it can be determined that the melt leakage phenomenon occurs in the die casting process, and operators can conveniently know the melt leakage phenomenon in time.

It can be seen that according to the die casting machine melt leakage detecting device provided by the embodiments of the present disclosure, by arranging the pulling wire 1 around the mold, the elastic wire connecting member 4 is spaced apart from and opposite to the trigger switch 5 when the pulling wire 1 is tensioned in the operating state, it can be determined that the melt leakage phenomenon occurs when the elastic wire connecting member 4 impacts the trigger switch 5, thus, operators can conveniently know the occurrence of the melt leakage phenomenon in time, further property losses are avoided, and the operation safety is improved.

Herein, the trigger switch 5 can be connected with the signal receiving end of the die casting machine through a signal line, or can be in wireless connection with the signal receiving end of the die casting machine as long as signal transmission can be achieved. As an example, a trigger switch 5 of the ZC-W166 model produced by OMRON can be used as the trigger switch 5, which is short in detection stroke and precise in control, and thus detection rapidity and accuracy are ensured.

During actual application of the die casting machine melt leakage detecting device provided by the embodiments of the present disclosure, when the elastic wire connecting member 4 is spaced apart from and opposite to the trigger switch 5, a signal received by the signal receiving end of the die casting machine from the trigger switch 5 is '0'. When the elastic wire connecting member 4 impacts the trigger switch 5, the signal received by the signal receiving end of the die casting machine from the trigger switch 5 is '1', the die casting machine immediately enters the depressurizing state, a power source for overflow or ejection of molten metal disappears, and the die casting machine is started for continuing die casting until the pulling wire 1 is remounted and restored.

According to the embodiments of the present disclosure, the pulling wire 1 is capable of withstanding the temperature outside the mold during normal die casting, misjudgment caused by high temperature breakage of the pulling wire 1 due to heat transfer in the normal die casting process is avoided, and the pulling wire 1 can be quickly melted and broken after making contact with molten metal, so that the sensitivity of melt leakage detection is improved. Based on the above description, the pulling wire 1 is preferably a nylon wire resistant to a temperature of 200 DEG C., thus, the high stability and reliability in the normal die casting process can be ensured, and the pulling wire 1 can be quickly melted and broken after making contact with molten metal, and accordingly the detection sensitivity is improved. Moreover, the toughness and strength of the nylon wire resistant to the high temperature of 200 DEG C. are good, the pulling wire 1 is not broken due to mold cooling water outflow and object falling during die casting operation, and therefore the operation stability is improved.

According to the embodiments of the present disclosure, the wire winding columns 2 are used for providing force application points, so that the pulling wire 1 is defined in a preset shape. For example, as shown in FIG. 1, three wire winding columns 2 can be arranged, the three wire winding columns 2 are fixed to the three vertices of the mold respectively. By cooperation of the three wire winding columns 2 with the wire fixing member 3 and the elastic wire connecting member 4, a quadrilateral structure matched with the mold structure can be defined.

Optionally, as shown in FIG. 1, the pulling wire 1 is rectangularly arranged around outside of the mold, and the distance between the pulling wire 1 and the mold is 3 to 5 cm, for example, the distance can be 3 cm or 4 cm or 5 cm or the like. In this way, the pulling wire 1 and the mold are kept at an appropriate distance, the pulling wire 1 is prevented from being mistakenly melted and broken due to excessively short distance, and the pulling wire 1 can be melted and broken in time after the melt leakage phenomenon occurs, so that a melt leakage signal is sent out.

According to the die casting machine melt leakage detecting device provided by the embodiments of the present disclosure, as an example, wire winding screws fixed on the bottom plate of the die casting machine can be used as the wire winding columns 2.

As another example, as shown in FIG. 2, multiple insertion holes 6 can be formed in the bottom plate of the die casting machine, and the bottom ends of the wire winding columns 2 are detachably inserted into the insertion holes 6. In this example, the number of the insertion holes 6 in the bottom plate of the die casting machine can be greater than the number of the required wire winding columns 2. Take the example that three wire winding columns 2 are arranged and distributed at three vertices of the mold, multiple insertion holes 6 can be formed in the outwards extension direction of each diagonal line of the mold, and the distances between the pulling wire 1 and the mold are different when the wire winding columns 2 are inserted into different insertion holes 6. In this way, the distance between the pulling wire 1 and the mold is adjustable, the appropriate distance can be selected according to different requirements during die-casting of different molten metals, and thus the applicable range of the melt leakage detecting device can be expanded. Optionally, multiple insertion holes 6 can be distributed in the bottom plate of the die casting machine in the direction parallel to the side length direction of the mold at intervals so that the number of the wire winding columns 2 can be increased according to the use requirements, and the pulling wire 1 is well supported and guided.

According to the embodiments of the present disclosure, the wire fixing member 3 is used for fixing an end of the pulling wire 1. The structure of the wire fixing member 3 is exemplified below:

as shown in FIG. 1, the wire fixing member 3 includes a tension adjusting plate 31 and a screw 32; the tension adjusting plate 31 is fixed on the bottom plate of the die casting machine; the tension adjusting plate 31 is provided with a screw hole matched with the screw 32; the screw 32 passes through and is fixed in the screw hole; and one end of the pulling wire 1 is connected with the screw 32.

In this way, an end of the pulling wire 1 is connected with the screw 32, and the screw 32 passes through and is fixed in the screw hole of the tension adjusting plate 31, so that the end of the pulling wire 1 and the bottom plate of the die casting machine are relatively fixed. By rotating the screw 32, the extension length of the screw 32 can be adjusted, the end of the pulling wire 1 is driven to move, and the tightness of the pulling wire 1 can be adjusted.

The elastic wire connecting member 4 is used for converting the broken state of the pulling wire 1 into an impacting signal of the trigger switch 5. For example, as shown in FIG. 1 and FIG. 3, the elastic wire connecting member 4 includes a fixing plate 41, a sliding rod 42 and a spring 43. The fixing plate 41 is fixed on a stand column of the die casting machine; the fixing plate 41 is provided with a through hole; and the sliding rod 42 is slidably delimited in the through hole. An end of the sliding rod 42 is connected with the pulling wire 1, and another end of the sliding rod 42 is opposite to the trigger switch 5. The spring 43 is mounted around the sliding rod 42 and is located between the end of the sliding rod 42 and the fixing plate 41. In this way, moving of the sliding rod 42 is controlled under the synergistic effect of the pulling wire 1 and the spring 43. When the pulling wire 1 is not broken, the pulling force of the pulling wire 1 is greater than the elastic force of the spring 43, and the another end of the sliding rod 42 is spaced apart from and opposite to the trigger switch 5. When the pulling wire 1 is broken, the spring 43 is restored to its original position, and the sliding rod 42 impacts the trigger switch 5 under the action of the elastic force.

Herein, the spring 43 can be located between the another end of the sliding rod 42 and the fixing plate 41, and the spring 43 is in a compressed state when the pulling wire 1 is in the operating state (see FIG. 1); or the two ends of the spring 43 can be connected with the end of the sliding rod 42 and the fixing plate 41 respectively, and the spring 43 is in a stretched state (see FIG. 3) when the pulling wire 1 is in the operating state. Both the above arrangement modes can be achieved: after the pulling wire 1 is broken, the sliding rod 42 impacts the trigger switch 5 under the elastic force of the spring 43. The spring 43 is more likely to loose and fail under the action of the pulling force compared with pressure action. Therefore, the spring 43 is preferably located between the another end of the sliding rod 42 and the fixing plate 41, so that the service life of the die casting machine melt leakage detecting device is prolonged.

In order to facilitate connection of the pulling wire 1 with the screw 32 and the sliding rod 42, an end of the screw 32 is provided with a threading hole, an end of the sliding rod 42 is provided with a threading hole, and thus the convenience and rapidity of the mounting process of the pulling wire 1 are improved.

The invention claimed is:

1. A die casting machine melt leakage detecting device, wherein the die casting machine melt leakage detecting device comprises a pulling wire, a plurality of wire winding columns, a wire fixing member, an elastic wire connecting member and a trigger switch;

the pulling wire is capable of withstanding temperature outside a mold during normal die casting and is melted and broken after making contact with molten metal;

the plurality of wire winding columns are arranged around the mold, an end of the pulling wire is connected with the wire fixing member, and another end of the pulling wire is sequentially wound around the plurality of wire winding columns and is connected with the elastic wire connecting member;

the elastic wire connecting member is opposite to the trigger switch, the elastic wire connecting member is in a compressed or stretched state when the pulling wire is kept tensioned in an operating state of the pulling wire, and the elastic wire connecting member is restored to an original position of the elastic wire connecting member and impacts the trigger switch when the pulling wire is broken;

the trigger switch is used for sending an impacting signal to a signal receiving end of a die casting machine.

2. The die casting machine melt leakage detecting device according to claim 1, wherein a nylon wire resistant to a temperature of 200 DEG C. is used as the pulling wire.

3. The die casting machine melt leakage detecting device according to claim 1, wherein the plurality of wire winding columns comprises three wire winding columns, and the three wire winding columns are fixed to three vertices of the mold respectively.

4. The die casting machine melt leakage detecting device according to claim 3, wherein the pulling wire is rectangularly arranged around outside of the mold, and a distance between the pulling wire and the mold is 3 to 5 cm.

5. The die casting machine melt leakage detecting device according to claim 1, wherein the wire fixing member comprises a tension adjusting plate and a screw;

the tension adjusting plate is fixed on a bottom plate of the die casting machine; the tension adjusting plate is provided with a screw hole matched with the screw; the screw passes through and is fixed in the screw hole; and the end of the pulling wire is connected with the screw.

6. The die casting machine melt leakage detecting device according to claim 5, wherein an end of the screw is provided with a threading hole.

7. The die casting machine melt leakage detecting device according to claim 1, wherein the elastic wire connecting member comprises a fixing plate, a sliding rod and a spring;

the fixing plate is fixed on a stand column of the die casting machine; the fixing plate is provided with a through hole; and the sliding rod is slidably delimited in the through hole;

an end of the sliding rod is connected with the pulling wire, and another end of the sliding rod is opposite to the trigger switch;

the spring is mounted around the sliding rod and is located between the end of the sliding rod and the fixing plate.

8. The die casting machine melt leakage detecting device according to claim 7, wherein the spring is located between the another end of the sliding rod and the fixing plate, and the spring is in a compressed state when the pulling wire is in the operating state; or two ends of the spring are connected with the end of the sliding rod and the fixing plate respectively, and the spring is in a stretched state when the pulling wire is in the operating state.

9. The die casting machine melt leakage detecting device according to claim 7, wherein the end of the sliding rod is provided with a threading hole.

10. The die casting machine melt leakage detecting device according to claim 1, wherein a plurality of insertion holes are formed in a bottom plate of the die casting machine, and bottom ends of the plurality of wire winding columns are detachably inserted into the insertion holes respectively.

* * * * *